Sept. 12, 1967 LE ROY R. BOGGS 3,341,387
APPARATUS AND METHOD FOR FILAMENT WINDING AND CURING
ON A PLURALITY OF MANDRELS
Filed Jan. 29, 1964 7 Sheets-Sheet 5
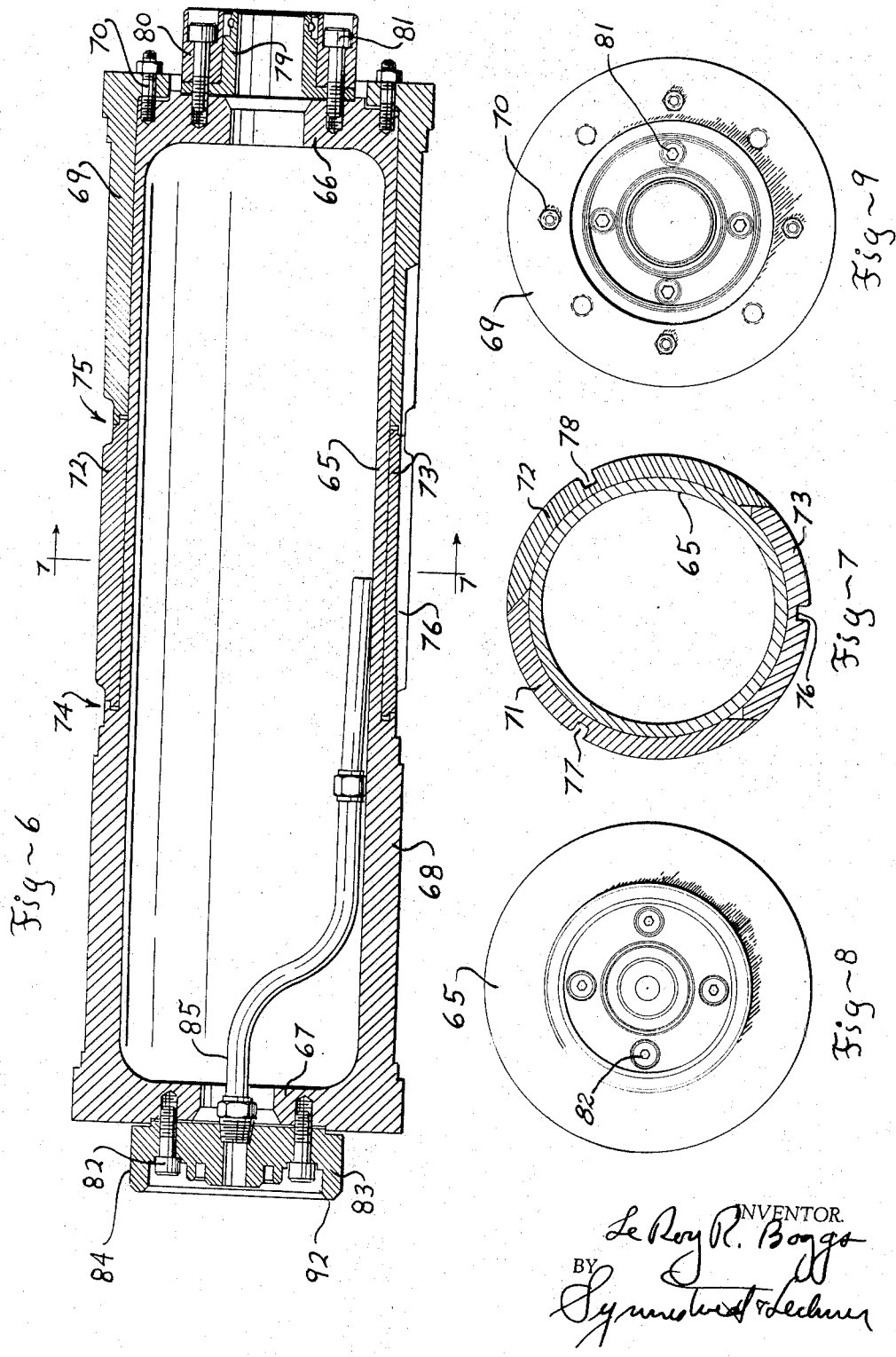

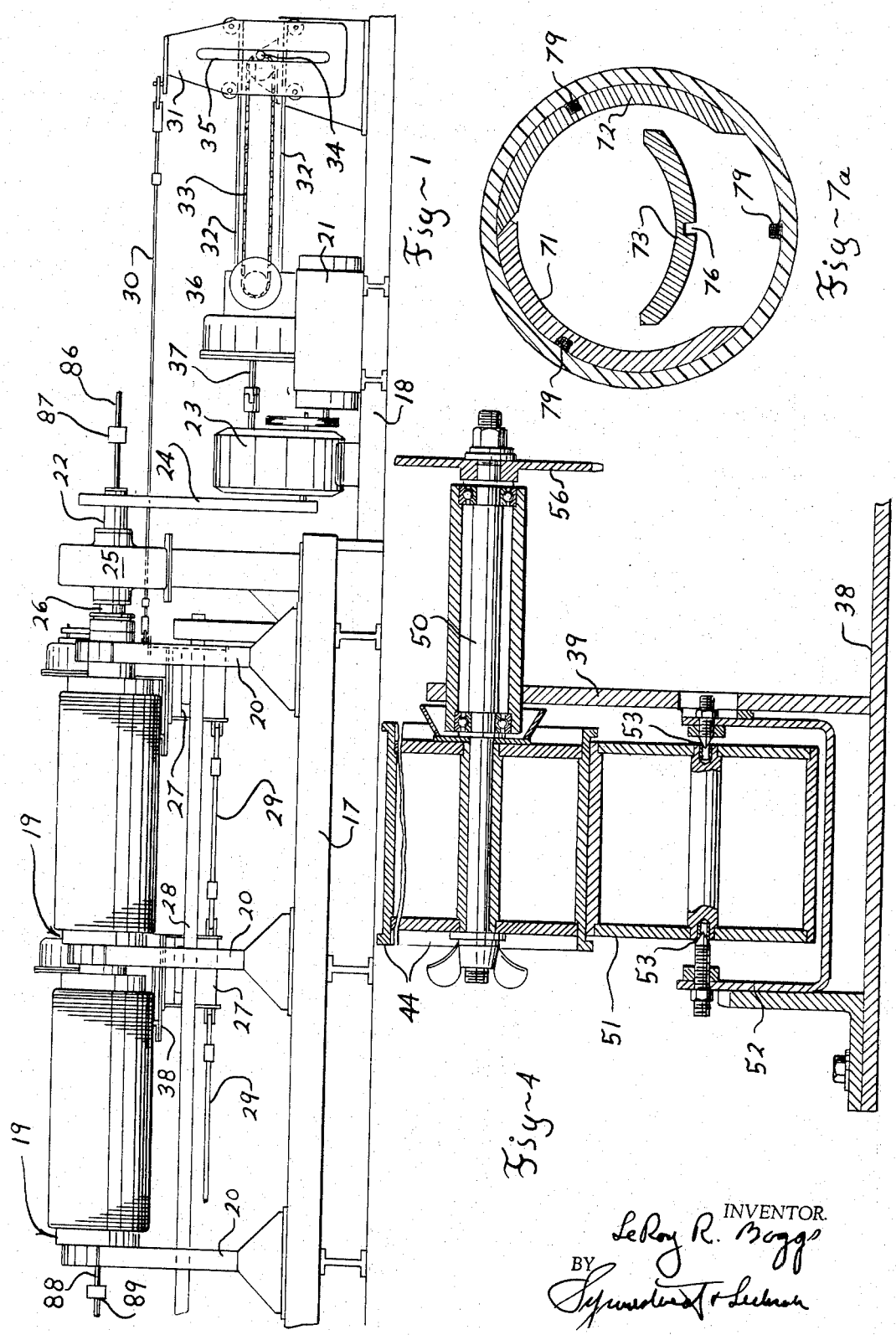

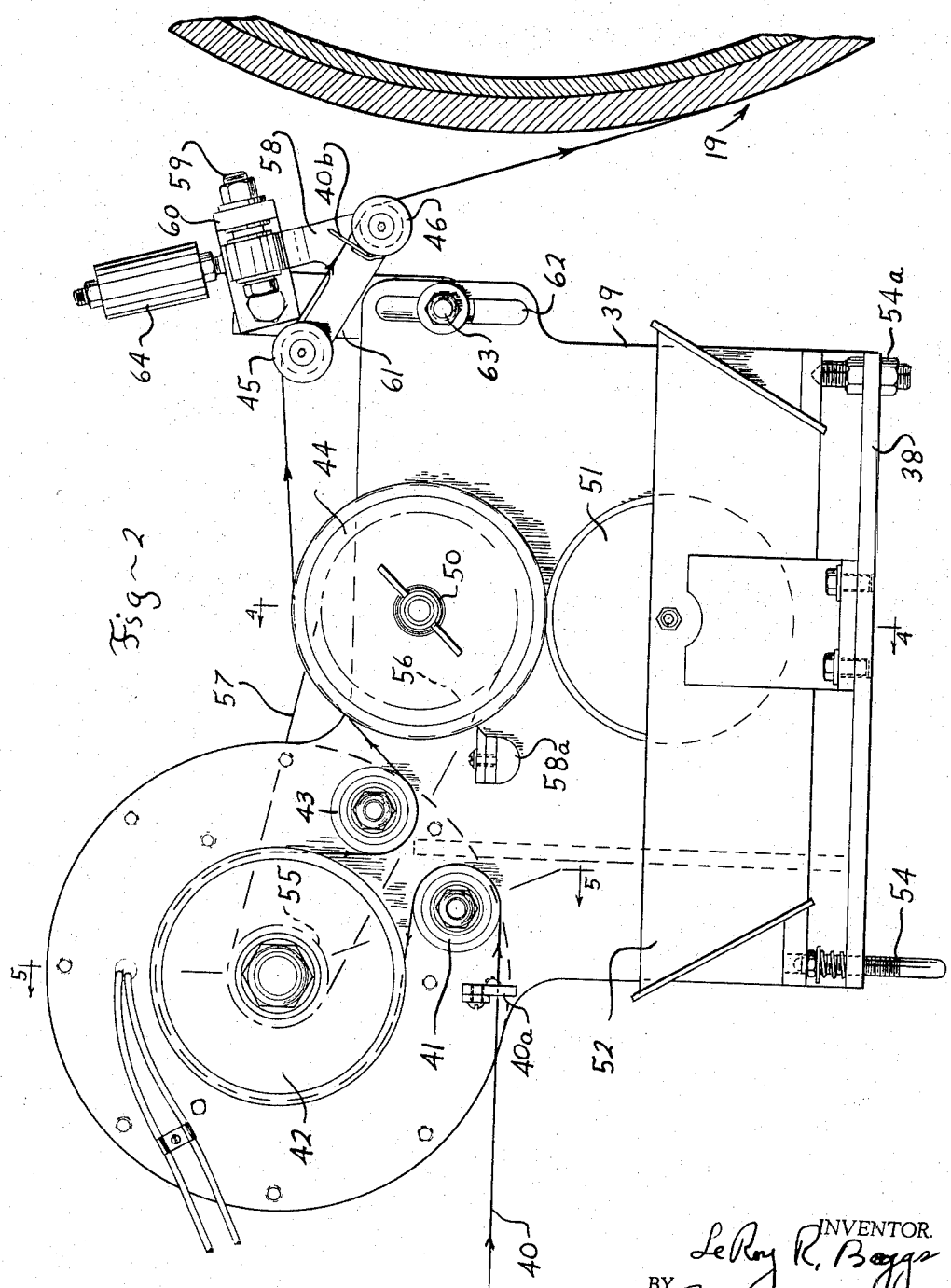

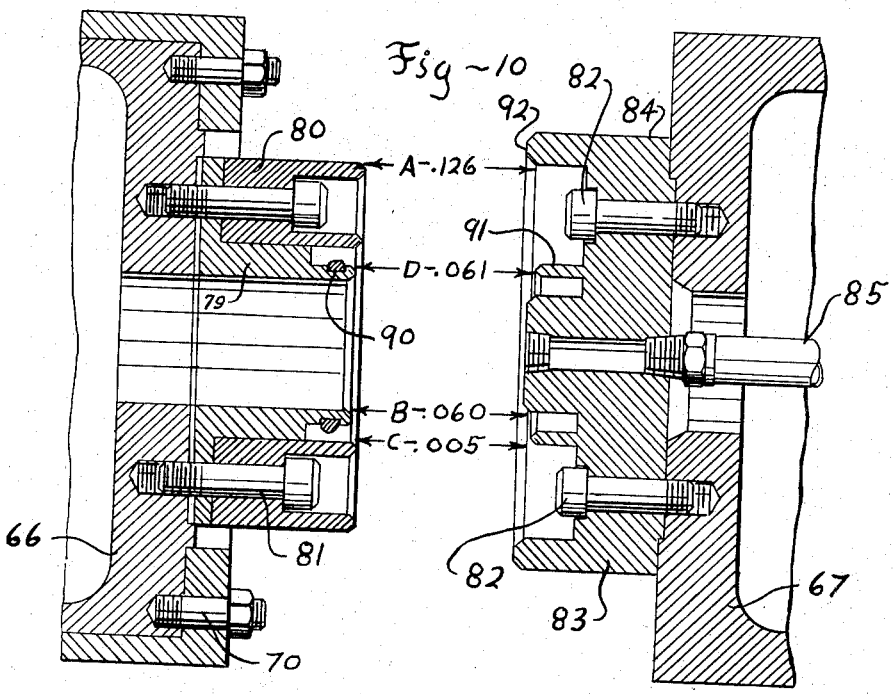
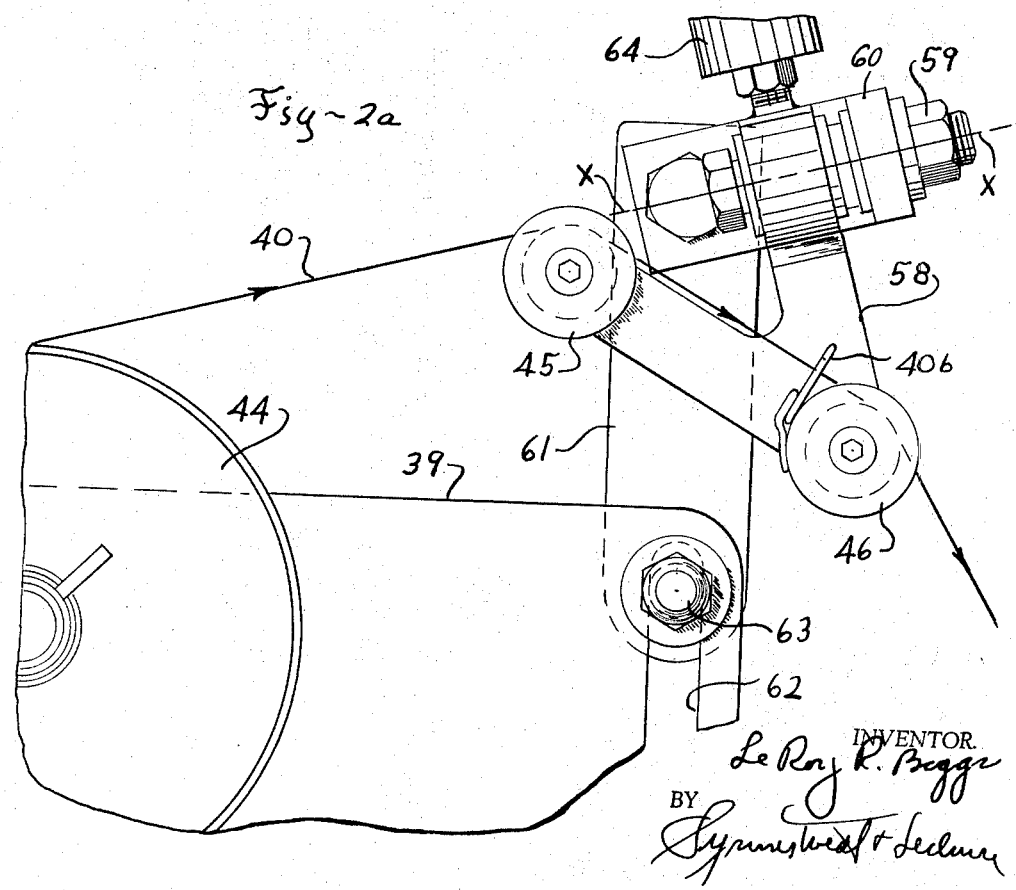

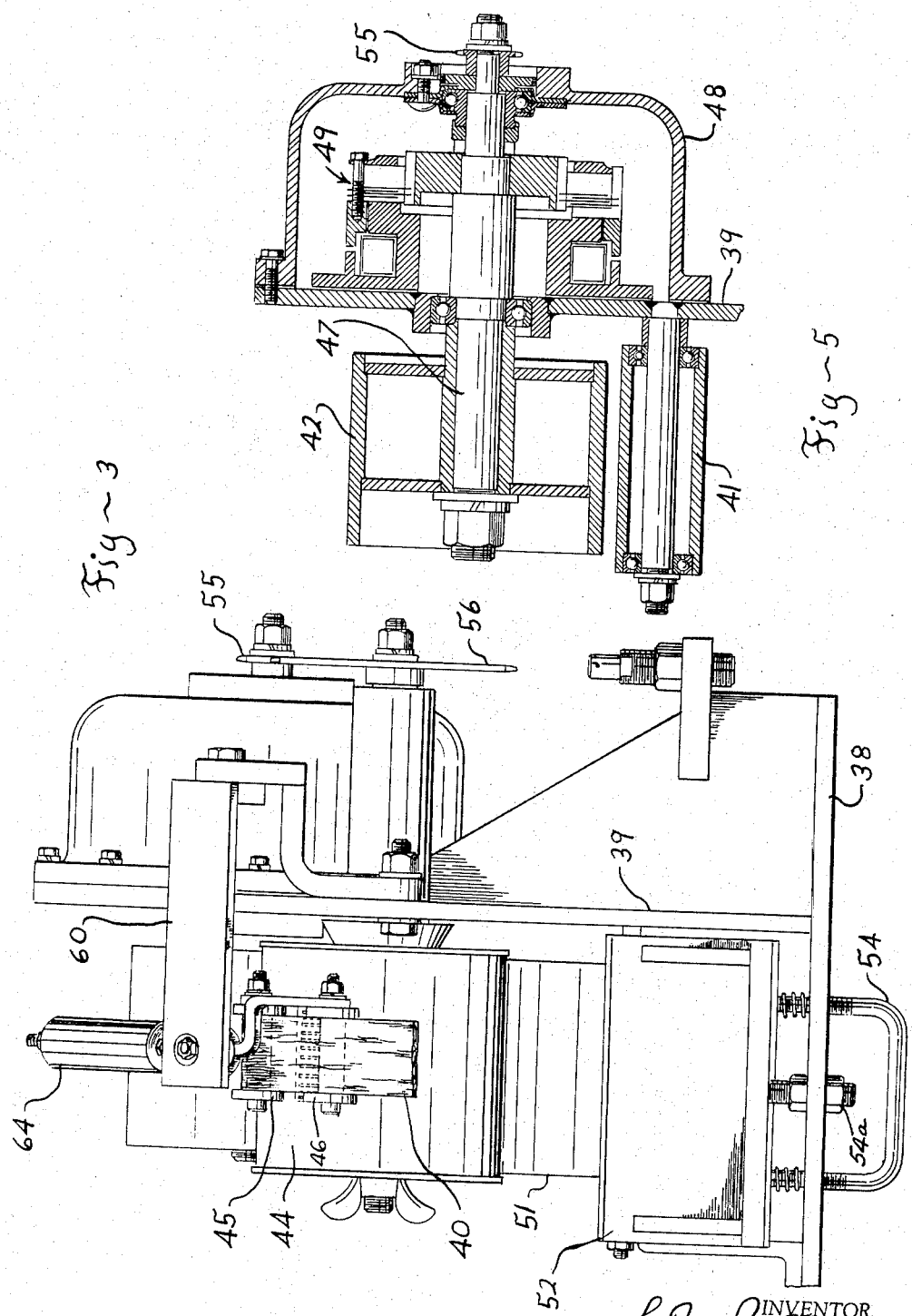

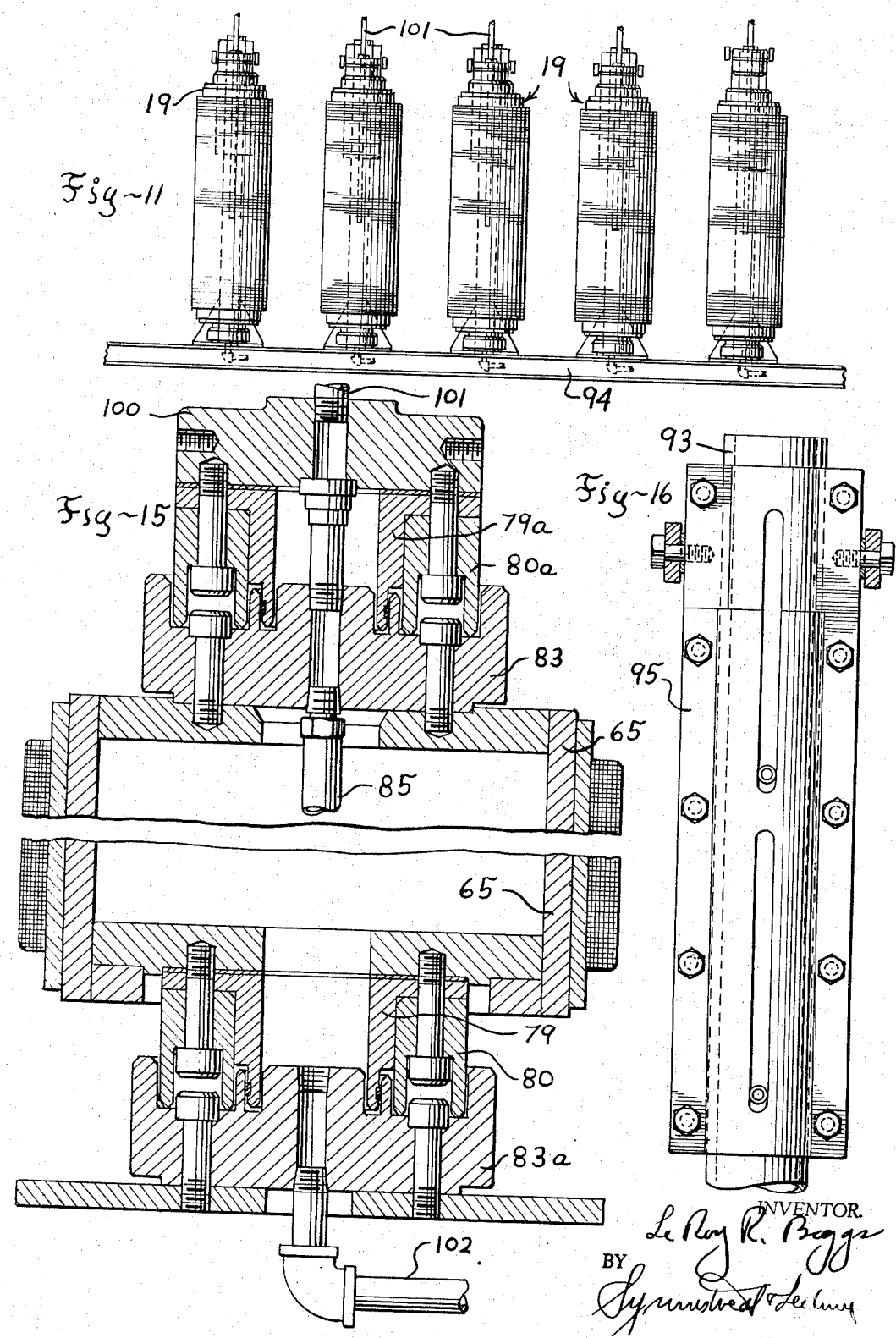

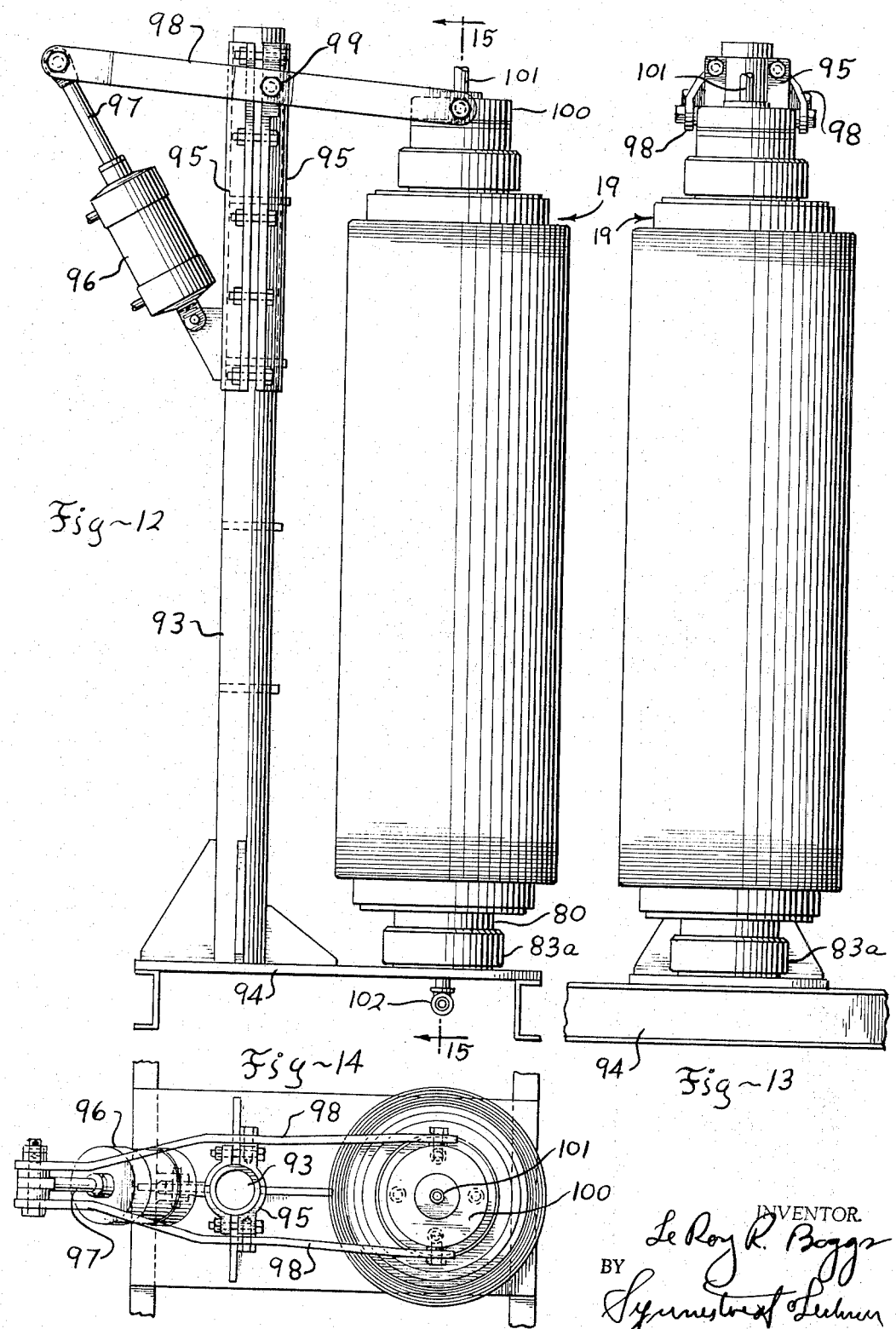

United States Patent Office 3,341,387
Patented Sept. 12, 1967

3,341,387
APPARATUS AND METHOD FOR FILAMENT WINDING AND CURING ON A PLURALITY OF MANDRELS
Le Roy R. Boggs, Bristol, Tenn., assignor to Universal Moulded Fiber Glass Corp., Bristol, Va., a corporation of Delaware
Filed Jan. 29, 1964, Ser. No. 340,960
18 Claims. (Cl. 156—175)

ABSTRACT OF THE DISCLOSURE

In filament winding method, resin material is added to the revolving hollow mandrels of a tandem arrangement and filament reinforcements are applied under tension to the mandrels. Internal heating of the mandrels during winding effects partial curing of the resin to a gel stage. The mandrels are uncoupled, racked individually, and internally heated to effect further curing of the resin. Additional mandrels are then installed and wound in the same manner.

The mandrels have novel end fittings that are interengageable so the rotating torque applied to one of a mandrel also rotates all interconnected mandrels. The mandrel is composed of parts so that an internal rib may be integrally formed on a tubular wound structure, and the mandrel may be disassembled to remove it from the tubular structure.

---

This invention relates to filament winding and is concerned with improvements in filament winding techniques, both from the standpoint of method and also from the standpoint of equipment employed. More specifically, the invention is concerned with improvement in filament winding techniques of the kind in which articles are formed, usually generally cylindrical articles, by winding glass fiber filament or rovings on a mandrel, the filaments or rovings being impregnated with a liquid heat hardenable or thermosetting resin material.

In a typical filament winding operation as practiced heretofore the mandrel is supported for horizontal rotation and the resin impregnated filament is laid upon the mandrel by means of a traverse mechanism, the filament or filaments being applied layer upon layer until the desired thickness of product is built up. In such a typical prior art operation, the mandrel is then removed from the filament winding machine and is placed in suitable bearing supports in which the horizontal rotation of the mandrel is continued and heat is applied in some manner in order to effect hardening of the resin. After hardening of the resin the article is separated from the mandrel, this being accomplished in various ways, depending upon the article being made. In one such prior known technique, the mandrel is made of a material which may be disintegrated after formation of the article, the mandrel thereby being removed through an end opening in disintegrated form.

In the foregoing and also various other prior known filament winding techniques the winding operation is relatively slow and in addition the handling operations required are also time consuming, so that with given filament winding equipment, only very small production is obtainable.

One of the principal objects of the invention is to provide improved method and apparatus for effecting filament winding operations by which much higher production is obtainable from given equipment.

One of the important aspects of the present invention contributing to increased production for given equipment is an improved method according to which the resin material is heated to effect initial hardening thereof to the solid stage while the resin impregnated filaments are being wound upon the mandrel, the heating being continued for a short time after completion of the winding in order that all resin applied shall have reached the gelled or initially solidified stage. Thereafter the mandrel with the solidified article thereon is removed from the winding machine to make way for a subsequent winding operation, and the removed mandrel is placed in a nonrotating, preferably vertical, rack in which the article is further heated to complete the curing or hardening of the resin, this being accomplished without rotation, since rotation is no longer needed to maintain the desired shape of the article because the article is already solidified. By operating in this way the winding time itself is utilized in part for curing purposes, and in addition this technique has the further advantage that it is no longer necessary to provide two machines or equipments for rotating the mandrels, the final curing being carried out with the mandrels stationary.

In increasing production with given equipment, the present invention further provides for mounting a multiplicity of mandrels in a series in the filament winding machine itself, i.e., in a series in which the mandrels are arranged end to end and in which the drive system cooperates with the one end of the first mandrel and delivers the driving torque to each succeeding mandrel through the mandrels themselves. In accordance with another aspect of this feature of the invention, separate traverse mechanism is provided for each mandrel, but the traverse mechanisms are linked together for common operation from a common driving system.

A further object of the invention is to provide for the use of internal steam heating for curing purposes both when the mandrels are mounted in the winding machine itself and also when they are located in the final curing rack, and with this end in view, the mandrels are provided with end fittings having passages therethrough adapted for serial flow of the steam from one mandrel to the next in the series, the condensate also being picked up in each mandrel and delivered serially through the next succeeding mandrels, being ultimately discharged from the last mandrel in the series.

Having still further in mind the importance of increasing production with given equipment, the present invention provides a novel form of end fittings for the mandrels which may readily be assembled and separated, so that a series of the mandrels may quickly and conveniently be set up in the winding machine and also removed therefrom after the wound articles are gelled. These end fittings are adapted automatically to bring the adjacent ends of mandrels into concentricity as they are brought together axially, thereby providing for convenience in making the driving and steam connections when the mandrels are assembled in the series.

A further feature of importance in this connection is a special arrangement of complementary interengageable parts provided on the end fittings and arranged so that dirt and foreign matter is effectively excluded from those interfitting parts having close tolerance, for instance the steam seal which is provided between adjacent ends of adjacent mandrels in the series.

Still another aspect of the invention is related to the objective of increasing production with given equipment, i.e., the structure of the mandrel itself. According to the invention, the mandrel is made up of several readily separable and assembleable parts which facilitates ultimate separation of the formed articles from the mandrels, even in instances where the interior bore of the article formed is provided with ribs or other projections which would tend to interlock the formed article with the mandrel.

Also having in mind increasing production with given equipment, the invention still further contemplates a filament feed capable of effectively and accurately handling a multiplicity of filaments at one time, these filaments being fed in side-by-side relation in the general form of a ribbon of considerable width, so that the buildup of the article on the mandrel is greatly accelerated as compared with the feed of a single or only a few filaments at once. At the same time the invention contemplates certain other improvements of filament feed and filament impregnating mechanisms, including the provision of a novel form of filament tensioning device adapted to maintain uniform tension on the filaments as they are being wound on the mandrel.

How the foregoing and other objects and advantages are attained will appear more fully from the following description referring to the accompanying drawings, in which:

FIGURE 1 is an overall elevational outline view of a filament winding machine constructed according to the present invention, two mandrels being indicated as being mounted in a series arrangement, although it is to be understood that the equipment is adapted to the concurrent use of a larger number of mandrels, for instance even six or eight;

FIGURE 2 is an enlarged elevational view of certain filament tensioning, impregnating and feeding devices as mounted on a traverse mechanism adjacent to a mandrel;

FIGURE 2a is a fragmentary view of certain parts shown in FIGURE 2 and illustrating a different adjusted position of certain parts, FIGURE 2a being on an enlarged scale as compared with FIGURE 2;

FIGURE 3 is a view of the filament tensioning, impregnating and feeding mechanism shown in FIGURE 2, the view being taken from the right of FIGURE 2;

FIGURE 4 is a sectional view of the resin impregnating mechanism, the view being taken as indicated by the section line 4—4 on FIGURE 2;

FIGURE 5 is a sectional view of the filament tensioning mechanism, this view being taken on the line 5—5 of FIGURE 2;

FIGURE 6 is an axial sectional view through a mandrel constructed according to the present invention;

FIGURE 7 is a transverse sectional view taken as indicated by the section line 7—7 on FIGURE 6;

FIGURE 7a is a view similar to FIGURE 7 but illustrating certain operations in removing the mandrel from the interior of a formed piece;

FIGURE 8 is an end view of the mandrel and end fittings at the left hand end of FIGURE 6;

FIGURE 9 is an end view of the mandrel and end fittings at the right hand end of FIGURE 6;

FIGURE 10 is a fragmentary view in axial section of the adjacent ends of a pair of mandrels, the two mandrels being slightly separated from each other and illustrating certain clearances preferably provided between complementary interengageable end parts of the end fittings of the mandrels;

FIGURE 11 is a view on a reduced scale illustrating a bank of mandrels mounted in the vertical racks employed for final curing of the resin;

FIGURE 12 is a side view of one of the mandrels and racks of FIGURE 11, this view being on an enlarged scale;

FIGURE 13 is a view on the scale of FIGURE 12 but illustrating the mandrel from the front, as mounted in the vertical rack;

FIGURE 14 is a top plan view of the mandrel and rack appearing in FIGURE 12;

FIGURE 15 is an enlarged axial sectional view through the mandrel mounted in the rack of FIGURE 12, this view being taken as indicated by the line 15—15 on FIGURE 12, but with the central portion of the mandrel and the formed article being broken out; and FIGURE 16 is an enlarged view of a portion of the vertical rack.

By way of example, it is herein assumed that the equipment and the method according to the present invention are being employed for the production of filament wound articles comprising generally cylindrical pieces approximating one foot in diameter and about three feet in length. It is further assumed that the articles are being wound with resin impregnated glass fiber rovings.

In FIGURE 1 the winding machine is illustrated as being built up upon base frame supports 17 and 18, the former serving to mount the mandrels themselves as well as the traverse mechanisms, and the latter serving to mount portions of the driving mechanisms.

Two mandrels are indicated in general at 19 in FIGURE 1, these mandrels being arranged in end-to-end relation and being mounted by means of standards 20 which are preferably adjustable along the base 17 so as to cooperate with mandrels of different length. At the upper ends of standards 20 separable bearing blocks are provided adapted to cooperate with bearing surfaces associated between fittings of adjacent mandrels. It will be understood that the machine is of greater length than indicated in FIGURE 1 and that additional mandrels may be added to the series in a direction extended to the left of the figure.

The drive system, which appears toward the right in FIGURE 1, includes the variable speed motor 21, which is connected with the input shaft of an infinitely variable speed reducing mechanism 23. The mandrel driving shaft 22 is adapted to be driven from the input shaft of the unit 23 by means of a belt 24. The drive shaft 22 is connected through a speed reducer 25 with the drive shaft 26 which is extended for connection with the adjacent end of the first mandrel in the series.

For each mandrel a traverse carriage 27 is provided, this carriage being arranged to reciprocate along guide tracks preferably enclosed at 28, the several traverse mechanisms being linked to each other as indicated at 29 for conjoint similar movement. All of these carriages are reciprocated by the reciprocating link 30 which is connected with the upper end of the carriage 31 which is mounted on tracks 32 and which is adapted to be reciprocated on those tracks by means of a sprocket mounted chain 33 carrying a drive element 34 engaging in a vertical slot 35 provided in the carriage 31. This type of traverse mechanism is disclosed and claimed in my copending application Ser. No. 224,472, filed Sept. 18, 1962. The chain 33 is adapted to be driven through a variable speed transmission 36 driven by the variable speed output shaft 37 of the speed reducing mechanism 23. The variable speed transmission 36 may be of the type disclosed in my copending application above identified and also in my copending application Ser. No. 331,270, filed Dec. 17, 1963, now Patent 3,275,414.

With the foregoing general arrangement of the filament winding machine in mind, attention is now directed to FIGURES 2 to 5 inclusive which illustrate the filament feeding mechanism. This feed mechanism includes various of the parts shown in these figures for each of the mandrels employed and all of these parts are mounted on one of the carriages 27 for traverse motion as above mentioned. Thus, as seen in FIGURES 1, 2, 3 and 4, the mounting plate for the parts carried by the carriage 27 is indicated at 38. This plate 38 in turn carries the upright plate 39 on which various rotative parts are journalled.

In FIGURE 2, the path of feed of the filaments or rovings is indicated by the line 40 and it will be seen in this figure that this feed path passes around an idler roll 41 (see also FIGURE 5) and then around the tension drum 42 to the idler roll 43 from which the filament feed path passes to contact the external peripheral surface of the resin applicator roll 44 (see also FIGURES 3 and 4). From the applicator roll 44 the feed path extends to and over a pair of spaced guide spools 45 and 46 which are mounted in a special manner to be described hereinafter.

The feed path of the filaments then extends to a point of tangency with the external surface of the mandrel, a fragment of which is generally indicated at 19 in FIGURE 2. Combs 40a and 40b aid in maintaining the rovings in orderly arrangement.

As best seen in FIGURE 5 the tensioning drum 42 is mounted on a shaft 47 which is journalled in the plate 39 and also in a housing 48 carried by that plate, the housing serving to enclose a magnetic brake generally indicated by the numeral 49. This brake is advantageously adjustable in a manner which is well known and neither the brake itself nor the adjustment need be considered in detail herein as they form no part of the present invention per se. For present purposes all that is required is to keep in mind that the brake mechanism applies a drag to the shaft 47 and thereby resists rotation of the drum 42 which is rigidly connected with the shaft, this in turn applying tension to the filaments being drawn through the mechanism by the winding of the filaments on the mandrel.

The guide rollers 41 and 43 ensure engagement of the rovings throughout most of the circumference of the drum 42.

The rovings pass from the guide roller 43 to the applicator roll 44 which is mounted and journalled by means of shaft 50 (see FIGURE 4). The applicator roll receives a coating of liquid resin material from the pickup or transfer roll 51 which dips into the supply of liquid resin provided in the resin pan 52. Provision is made for vertically adjusting the resin pan 52 together with the pickup roll 51, which latter is journalled by means of pivot bearings 53 in the resin pan, in order to provide for regulation of the clearance between the pickup roll and the applicator roll 44. This adjustment includes screw thread devices 54 and 54a associated with the base plate 38 (see FIGURES 2 and 3). The use of pivot bearings 53 in the mounting of the roll 51 is advantageous because of the constant presence of the resin in the neighborhood of these parts, the kind of bearing illustrated being capable of continued operation notwithstanding contact therewith of resin material.

The applicator or wetting roll 44 may either be freely rotative and thus merely turned by contact of the rovings therewith, or may be driven from the brake drum 42, for which purpose sprockets 55 and 56 are provided respectively on the shafts 47 and 50 of the brake drum and applicator roll. A chain shown at 57 in FIGURE 2 may be used to interconnect the sprockets 55 and 56. A scraper blade 58a (see FIGURE 2) is desirably positioned adjacent the surface of the applicator roll 44, in order to remove any abnormally large particles or lumps from the layer of resin about to be applied to the rovings.

By the arrangement described above, the rovings may be wetted out with a substantially uniform and controlled quantity of resin material, thereby enhancing the uniformity of the article being wound. For many purposes, free rotation of the applicator roll 44 is adequate to effect thorough impregnation of the rovings passing in contact with the applicator roll, but in certain cases, the establishment of a differential speed between the surface of the applicator roll and the motion of the rovings is desirable to enhance the impregnating action. Thus, with the sprocket 55 of small size and the sprocket 56 of large size and with the chain interconnection 57, the roll 44 may be caused to rotate at a surface speed considerably lower than the actual speed of the rovings being handled.

The rovings being handled, which are illustrated at 40 in FIGURE 3 in the manner of a ribbon, pass over the guide spools 45 and 46, as noted above, and attention is now called to the fact that these guide spools are mounted on a bracket 58 which is slung from a pivot mounting 59, the bracket and thus the guide spools 45 and 46 being free to oscillate back and forth about the axis of the pivot mounting 59. The pivot 59 is in turn carried by a strip 60 mounted on a bracket 61 which in turn is vertically adjustable with relation to the vertical mounting plate 39 by means of a slot 62 in the plate and a cooperating clamping nut and bolt 63. This pivotal mounting for the guide spools 45 and 46 permits the feed path between the spool 46 and the mandrel 19 to angle back and forth during the traverse motion to thereby lay the ribbon of rovings in an orderly manner onto the surface of the mandrel, without tendency for the rovings to take the form of a bundle. The adjustable mounting for the bracket 58 provides for a slight variation in the position of the axis of the mounting pivot 59 in relation to the path of the rovings between the applicator roll 44 and the first of the guide spools 45. This will be apparent from comparison of FIGURES 2 and 2a, in which latter figure the axis of pivot 59 has been indicated at xx. In the position of adjustment shown in FIGURE 2a, which is preferred for most purposes, the axis xx lies in the plane of the rovings as they approach the spool 45 from the applicator roll 44, the axis xx also being positioned in the middle of the rovings, and in consequence of this relationship the oscillation of the guide spool 45 merely results in a slight twisting motion of the ribbon of rovings, without tendency to stretch or slacken the rovings toward either edge of the ribbon.

To ensure free action of the bracket 58 and thus of the spools 45 and 46 in their pivotal motion about the axis xx, a counterweight 64 is connected with the bracket 58 above the axis xx, thereby neutralizing the action of gravity on the parts below the axis and thereby ensuring that the oscillating motion of the bracket and of the guide spools will occur only as a result of the natural direction of pull on the rovings themselves as they are being laid upon the surface of the mandrel.

The construction of the mandrel itself is particularly illustrated in FIGURES 6 to 10 inclusive. Here it will be seen that the mandrel is built up on a main cylindrical member 65 which is hollow and which has end portions 66 and 67 to which end fittings described herebelow are connected. Toward one end of the mandrel (the left end in FIGURE 6) the main cylindrical member 65 is provided with an external surface 68 adapted to define a portion of the interior bore of an article being made. Toward the opposite end of the mandrel an external removable cylindrical member or sleeve 69 is provided, this member being adapted to be fastened to the end of the main member 65 by studs 70. The member 69 serves to define a portion of the bore of the article being wound at the right hand end of the mandrel. Intermediate the portions 68 and 69 the mandrel is provided with a segmented sleeve comprising parts 71, 72 and 73 (see FIGURE 7). The parts 71, 72 and 73 have shoulders toward the ends thereof adjoining the mandrel parts 68 and 69 and interfitting therewith to prevent radially outward displacement of the parts 71, 72 and 73 when all of the pieces of the mandrel are assembled as indicated in FIGURE 6.

Attention is now directed to the fact that in the illustrative mandrel herein disclosed, provision is made for producing an article having certain projections on the inside or bore surface of the article. Thus it will be seen in FIGURE 6 that at the edges of the parts 68 and 69 adjoining the intermediate segmented pieces, annular recesses 74 and 75 are provided in which, in the filament winding operation, filaments are initially wound until the recesses are substantially filled, whereupon the winding proceeds over the entire length of the mandrel. In addition, in the illustrative embodiment shown, longitudinal slots 76, 77 and 78 are provided in the intermediate segmented parts 71, 72 and 73 and also in one of the other mandrel parts (69). In making up an article on this mandrel, preformed longitudinal strips 79 (see FIGURE 7a) advantageously of glass fiber reinforced resin are inserted in the slots 76, 77 and 78 prior to commencement of the winding operation. Such strips are desirably notched out at any point where radial grooves such as those indicated at 74 and 75 occur. In accordance with the foregoing, articles may be made having either or both of longitudinal and radial projections on the inside bore and it will be noted that the mandrel parts are so arranged that they may readily be separated and the formed article thus removed from the mandrel, notwithstanding the presence of these various types of internal projections. The sequence of steps followed in the separation of an article from a mandrel includes first the loosening of the nuts on the studs 70, the axial separation of the cylindrical member 69 from the right hand end of the assembly when viewed as in FIGURE 6, the withdrawal of the main cylindrical part of the mandrel 65 (including the part 68) from the left hand end of the article formed, and thereafter (see FIGURE 7a) the collapse of the segmented parts by first radially inwardly displacing the part 73, for instance to the position shown in FIGURE 7a and the removal of the part 73 out of the end of the formed piece. Thereupon the remaining parts 71 and 72 will readily collapse inwardly and may be removed through the end of the piece.

It should be noted that the mandrel is thus removable from the article without requiring the presence of any joint or connection between parts defining the interior hollow of the mandrel.

As seen in FIGURES 6, 8, 9 and 10, the right hand end of the mandrel is provided with an end fitting made up of parts 79 and 80 which are fastened to the end 66 of the inner or main mandrel part 65 by means of bolts 81. Each of these bolts 81 is deeply countersunk in the part 80 in order to provide a series of recesses adapted to receive the heads of bolts 82 of an adjoining mandrel. Bolts 82 serve to connect the end fitting 83 to the opposite end 67 of the main part 65 of each of the mandrels. In this way when the mating ends of adjacent mandrels are brought together a driving connection is provided by engagement of bolt heads 82 within the recess about the heads of bolts 81 in the other mandrel.

Attention is now called to the fact that the end fitting 83 is provided with an external cylindrical surface 84 which serves as a bearing surface for mounting the mandrels. Referring again to FIGURE 1 it will be seen that the mounting standards 20 and the journals at the top thereof are positioned so as to cooperate with the bearing surface 84 lying between each pair of adjacent mandrels mounted in the machine. In addition a fitting configured in the manner of the fitting 83 is connected with the power shaft 26 at the right hand end of the series of mandrels as viewed in FIG. 1, and this serves to transmit the driving torque from the power shaft to the right hand end of the first mandrel in the series. Each of the fitting parts 79 and 83 are centrally apertured for passage of heat transfer medium, these apertures being in alignment with the central apertures also provided in the end walls 66 and 67 of the main mandrel members 65. A pipe 85 is associated with the central aperture in the fitting 83 and extends into the interior hollow in the member 65. Pipe 85 is a flexible pipe so that the inner end thereof always rests against the bottom of the inside wall of the cylindrical mandrel member 65. In this way the inner end of the pipe is positioned to pick up condensate resulting from the cooling of steam passing through the series of mandrels to effect heating thereof.

Steam is adapted to be admitted into the right hand end of the series of mandrels when viewed as in FIGURE 1 through the steam supply connection 86 having a swivel joint 87 and through the drive parts 22, 25 and 26. Similarly, at the opposite end of the series a condensate outlet connection 88 is provided having a swivel joint 89 therein.

Upon introduction of steam into the series of mandrels in the winding machine, the steam enters the right hand end of the mandrel at the right hand end of the series and flows through the pipe 85 in the first mandrel into the second mandrel, and so on throughout the series. Since the pipes 85 have their inlets maintained adjacent the bottom wall of the interior hollow in the mandrels, condensate is picked up and carried through the mandrels serially, for ultimate discharge through the pipe 88 at the left hand end of the series.

Because of the steam pressure to be carried through the series of mandrels, it is necessary to seal the joints between adjacent mandrels and this is provided by certain interengaging surfaces and sealing elements of the end fittings of the mandrels. This is most clearly shown in FIGURE 10 in which an O-ring 90 is shown as associated with the inner part 79 of one of the end fittings in position to cooperate with the inside surface of the annular ring 91 provided on the end fitting 83. For the purpose of facilitating interengagement of opposite end fittings of adjoining mandrels, the end fittings are provided with various complementary surfaces and chamfers which are indicated by letters A, B, C and D in FIGURE 10, together with a numerical value representing the clearance provided between the complementary parts. In each case the letter indicates one cylindrical surface and the related chamfer. Also the same letters identify mating surfaces on each end of the end fittings of the mandrel.

Surfaces A indicated on each end of the mandrel are the first surfaces to engage upon assembly of two mandrels. Chamfer A in each case is $3/16''$ and the combination of the two will align any initial approach within $3/8''$, which is in practice a very easy manual alignment (these dimensions being appropriate for a mandrel generally of the size hereinabove mentioned). These chamfers receive each other until the cylindrical surfaces begin to engage. The diametral clearance of these two A diameters averages .126", which is a fairly crude fit and will accommodate grit and dirt that might be on these exterior surfaces without any damage. The next surfaces to make contact are chamfers B indicated on each end of the mandrel. These guide into the mating cylindrical surfaces B, which have a diametral clearance averaging .060". This again is enough to accommodate extraneous particles which might be on the interior surface of the left hand end (rust, etc.).

Continued axial engagement causes intersection next of chamfers C which guide to ultimate engagement of cylindrical surfaces C which have average diametral clearance of .005", which is a true and close enough fit to serve as a static bearing surface and prevent any appreciable relative motion between adjacent mandrels. This fit, though mechanically desirable, would be impractical on exposed surfaces subject to contamination unless there was careful cleaning after each assembly. However, it will be noted that these surfaces are rather obscure and in practice are relatively free of contamination. Further axial engagement results in the contact of the O-ring 90 with chamfer D on ring 91 designed for that purpose and its compression and seal against cylindrical surface D, the two metallic surfaces of D never actually contacting since they have an average clearance of .061", and surface C will maintain alignment within .005".

This sequence of interengagement of various parts occurs within a fraction of a second and actually, in a production operation requiring assembly and disassembly of mandrel joints many times in a day, for instance 100 times, this results in a very substantial saving in time.

An edge surface 92 provided on the end fitting 83 serves as a thrust bearing between adjacent mandrels.

The end fittings at opposite ends of the mandrels are also utilized in the heating operation which is carried out after the mandrels are removed from the filament winding machine and are placed in vertical position in the vertical racks which are illustrated in FIGURES 11 to 16.

In FIGURE 11 there is illustrated a series of mandrels 19 with wound articles thereon statically mounted in vertical position in the vertical racks which are shown in greater detail in FIGURES 12, 13 and 14. Each of these racks comprises a vertical post 93 rising from a base 94 and carrying toward its upper end a pair of clamping brackets 95—95 which are vertically adjustable on the post. One of these brackets serves to mount one end of the operating cylinder 96, the piston rod 97 which projects from that cylinder being pivotally connected with the lever 98, which lever is pivotally mounted on one of the bracket parts 95 as indicated at 99. The lever 98 is of multi-part construction as indicated in FIGURE 14 and serves to mount a steam supply fitting 100 having a steam supply connection 101, advantageously a flexible tube so as to accommodate the motion of the lever 98. To the fitting part 100, a fitting 79a–80a is fastened in position to cooperate with the end fitting 83 of one of the mandrels (see particularly FIGURE 15). In this way a sealed steam connection is provided to the interior hollow of the mandrel part 65 through the flexible pipe 85.

At the lower end, the mandrel is supported in a fitting 83a complementary to the end fitting 79–80 and a condensate drain pipe 102 is associated with the fitting 83a.

It will be noted from FIGURE 15 that the various interfitting parts at the two ends of the mandrel mounted in the vertical rack are essentially the same as those described above, so that the end fittings of the mandrels are not only used for the purposes described above in the filament winding machine itself, but also in the vertical racks provided for final curing of the resin. It will be observed that contrary to the arrangement when the mandrels are mounted in the filament winding machine, the steam inlet occurs in the vertical rack through the pipe 85, which serves as steam outlet and condensate drain when the mandrels are in the filament winding machine.

In connection with the illustration of the mandrel itself in FIGURE 15 it should be understood that the various wall parts of the mandrel are shown in a generalized or diagrammatic manner, the actual structure preferred being illustrated in FIGURES 6 to 10 inclusive.

By providing for partial curing of the articles formed while winding is occurring, a great saving in time is effected. In addition by continuing the cure in the filament winding machine itself beyond the end of the winding period just sufficiently to gel or solidify the articles, the articles need not thereafter be mounted in rotative mechanism when the curing is completed. Indeed, it is of especial advantage and convenience to use the stationary vertical racks described above for the final curing, because in this vertical position gravity drainage of the condensate is effective, whereas when in the horizontal position, special condensate drainage problems are presented.

In accordance with the invention many different aspects of the method and equipment serve to greatly accelerate production with given equipment and this is of great advantage in the field of filament winding, which, inherently and at best, is a piecemeal operation requiring considerable time for effecting various of the essential steps.

I claim:

1. In the production of filament reinforced resin articles, the method which comprises rotating a plurality of hollow cylindrical mandrels in axially aligned horizontal position in a filament winding machine, applying filament reinforcements and liquid heat hardenable resin material to the outside surfaces of the mandrels, the filament reinforcements being fed to the mandrels to effect filament winding thereon, while the mandrels are rotating passing a heat transfer medium axially sequentially through the aligned mandrels to initiate hardening of the resin material, after the articles are solidified but before the resin material is fully hardened, terminating rotation of the mandrels and removing them from the winding machine, and thereafter separately passing heating medium through each of the mandrels to further harden the resin material.

2. In the production of filament reinforced resin articles, the method which comprises rotating a plurality of hollow cylindrical mandrels in axially aligned horizontal position in a filament winding machine, applying filament reinforcements and liquid heat hardenable resin material to the outside surfaces of the mandrels, the filament reinforcements being fed to the mandrels to effect filament winding thereon, while the mandrels are rotating passing steam axially sequentially through the aligned mandrels and withdrawing condensate axially sequentially through the mandrels to initiate hardening of the resin material, after the articles are solidified but before the resin material is fully hardened, terminating rotation of the mandrels and removing them from the winding machine, and thereafter and with the mandrels in upright position separately introducing steam into the upper end of each mandrel and separately withdrawing condensate from the lower end of each mandrel to further harden the resin material.

3. Equipment for making filament wound resin articles comprising an interiorly hollow mandrel having end fittings each with a passage therethrough to provide for flow of a heating medium through the interior hollow, drive means engageable with one of the end fittings to effect rotation of the mandrel on a horizontal axis, the drive means having a steam supply passage therethrough communicating with the passage in the end fitting with which the drive means is engaged, a pipe within the interior hollow having a free end arranged to remain adjacent the bottom of the interior hollow of the mandrel when the mandrel is rotated and with its other end communicating with the passage in the fitting at the end of the mandrel opposite to the driving end, said pipe providing for condensate drainage when the mandrel is being rotated on a horizontal axis, and additional mechanism for introducing steam into and draining condensate from the mandrel including a rack adapted to receive the mandrel in a generally upright position with the driving end down and the other end up and having a steam inlet fitting toward the top adapted to introduce steam into the interior hollow through said pipe, the passage through the fitting at the lower or driving end of the mandrel serving for condensate drainage when the mandrel is in said rack.

4. Equipment according to claim 3 in which the end fittings of the mandrel have counterpart interengageable parts providing for serial drive of one mandrel from another and for serial delivery of steam from one mandrel to another.

5. Equipment according to claim 4 in which one of the interengageable fitting parts is provided with a bearing surface providing for rotative mounting of adjacent ends of adjacent mandrels in a series thereof.

6. A mandrel adapted for use in filament winding operations, the mandrel comprising a generally cylindrical hollow body with end closures that are provided with external end fittings adapted to interengage with the end fittings of other similarly constructed mandrels to provide for series arrangement of a plurality of such mandrels in axial alignment with each other, and the end fittings at opposite ends of the mandrel having complementary parts adapted to interfit when a plurality of mandrels is assembled in series arrangement, the complementary parts including two sets of such parts arranged concentrically of each other and coaxially of the mandrel, the outer set of said parts projecting axially at the end of the mandrel beyond the inner set to provide for interengagement of the outer set prior to interengagement of the inner set when two of such mandrels are assembled by bringing them axially toward each other, and the outer set having chamfered edges adapted to effect alignment of said two mandrels when being assembled and thereby facilitate interengagement of the inner set of complementary parts.

7. A mandrel according to claim 6 in which the mandrel is interiorly hollow, in which the end closures and fittings have passages therethrough located radially inwardly of an inner set of complementary interfitting parts and communicating with the interior hollow to provide for serial flow of heating medium from one such mandrel to another when assembled in a series, and sealing means associated with said inner set of complementary parts to seal the joint between said passages in the region between adjacent mandrels in a series thereof.

8. A mandrel adapted for use in filament winding operations, the mandrel comprising a generally cylindrical hollow body with end closures that are provided with external end fittings adapted to interengage with the end fittings of other similarly constructed mandrels to provide for series arrangement of a plurality of such mandrels in axial alignment with each other, the end fittings having complementary driving parts at opposite ends of the mandrel adapted to interengage when a plurality of such mandrels is assembled in series arrangement, and the end fittings at opposite ends of the mandrel further having complementary aligning parts adapted to interfit when a plurality of such mandrels is assembled in series arrangement.

9. In a filament winding machine having means for supporting and rotating a winding mandrel about a horizontal axis, filament feed mechanism establishing a feed path to the mandrel and having a mounting carriage arranged for traverse motion with respect to a mandrel, said mechanism comprising a tensioning drum on the carriage having an external cylindrical surface of substantial width adapted to accommodate a ribbon comprising a plurality of side-by-side filaments in contact therewith, a brake for resisting rotation of the drum to thereby tension the filaments, a guide spool along the path of feed between the tensioning drum and the mandrel having a cylindrical guide surface over which the feed path of said ribbon of filaments changes direction, pivotal mounting means for the guide spool providing freedom for angular movement of said spool about a horizontal axis lying substantially in the plane of the ribbon of filaments as it approaches the guide spool and extended axially thereof at the center of said ribbon.

10. A construction according to claim 9 and further including additional filament guide means located below said pivot axis and mounted for pivotal movement about said axis together with the guide spool, and counterweight means located above said pivot axis acting to minimize the effect of gravity on the pivotal motions of the guide spool and guide means.

11. A mandrel for use in filament winding an article having a generally cylindrical bore with an internal annular rib intermediate the ends of said bore, the mandrel comprising axially separable cylindrical members having externally recessed portions at their meeting ends adapted to define a groove of shape complementary to the annular rib to be formed in the bore of the article being made.

12. A mandrel for use in filament winding an article having a generally cylindrical bore with axially spaced internal projections intermediate the ends of the bore, the mandrel comprising two cylindrical members adapted for axial assembly and separation and adapted respectively to define the end portions of the cylindrical bore beyond the internal projections, a central cylindrical mandrel portion formed of circumferentially segmented parts, and a cylindrical sleeve lying within the central mandrel portion for supporting the segmented parts, the sleeve being axially separable with relation to the segmented parts to provide for removal of the segmented parts from a formed article by inward collapsing movement of said parts.

13. A mandrel according to claim 12 in which the supporting sleeve for the segmented parts is connected with one of the two axially separable cylindrical parts for separation therewith.

14. A mandrel according to claim 12 in which the two cylindrical members have edge portions which are axially separable from but interengageable with the intervening segmented parts to retain the segmented parts as against radially outward displacement away from the remainder of the mandrel structure.

15. A mandrel for use in filament winding an article having a generally cylindrical bore, the mandrel comprising a hollow cylindrical body extended throughout the length of the mandrel, end fittings on the body having passages therethrough for circulation of a heating medium through the interior of the mandrel, and a cylindrical member surrounding the cylindrical body to define a portion of the bore of the article being formed, the cylindrical member and the cylindrical body being axially separable from each other.

16. In a filament winding machine having means for supporting and rotating a winding mandrel about a horizontal axis:
(a) filament feed mechanism establishing a feed path to the mandrel, and having a mounting carriage arranged for traverse motion with respect to a mandrel, said mechanism comprising a tensioning drum on the carriage with which a filament being fed is engaged;
(b) a brake for resisting rotation of the drum to thereby tension the filament;
(c) impregnating mechanism on the carriage comprising a reservoir for liquid but hardenable resin material; and
(d) a resin pick-up roll and a cooperating pick-up roll for transferring liquid resin material from the reservoir to the filament at a point in the feed path between the tensioning drum and mandrel, said feed path extending around a portion of the circumference of the applicator roll.

17. Apparatus for making filament wound resin articles comprising:
(a) a plurality of hollow cylindrical mandrels arranged in series having end closures that are provided with external interengageable end fittings, said end fittings being adapted to transmit driving torque from mandrel to mandrel in said series, and with said end closures and end fittings having therein passages for the circulation of a heating fluid through said series of mandrels;
(b) an external bearing surface on at least one end fitting of each cooperating pair of fittings; and
(c) bearing supports located between adjacent mandrels and cooperating with said bearing surface.

18. Equipment according to claim 17 and further including for each mandrel a condensate drain pipe with its inlet end arranged to remain adjacent the bottom of the interior hollow of the mandrel when the mandrel is rotated and with its discharge end communicating with the passage through one of the end fittings of the mandrel to provide for serial flow of the condensate through the mandrels.

References Cited
UNITED STATES PATENTS

| | | | |
|---|---|---|---|
| 1,033,010 | 7/1912 | Harris | 156—173 |
| 2,386,203 | 10/1945 | Field | 34—153 |
| 2,563,642 | 8/1951 | Colombu et al. | 242—158 X |
| 2,731,067 | 1/1956 | Miller | 156—190 |
| 2,731,376 | 1/1956 | Rusch | 156—175 |
| 2,794,481 | 6/1957 | Anderson | 156—425 |
| 2,810,931 | 10/1957 | Wolfe | 18—45 |
| 2,837,456 | 6/1958 | Parilla | 156—173 X |
| 3,112,530 | 12/1963 | Boggs et al. | 18—26 |
| 3,112,897 | 12/1963 | Eshbaugh et al. | 156—169 X |
| 3,114,173 | 12/1963 | Boggs et al. | 18—26 |
| 3,159,515 | 12/1964 | Dunlap et al. | 156—282 X |

EARL M. BERGERT, *Primary Examiner.*

J. P. MELOCHE, *Assistant Examiner.*